Sept. 21, 1965   W. L. CARLSON   3,206,840
METHOD OF MAKING A PINION AND DISC
Filed Nov. 14, 1961   2 Sheets-Sheet 1
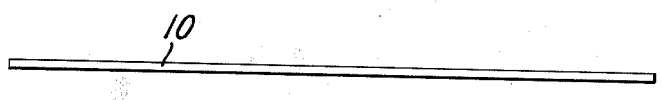
Fig.1
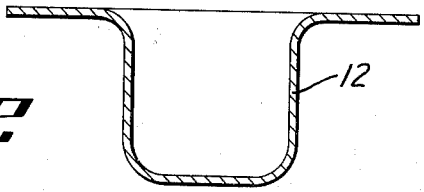
Fig.2
Fig.3
Fig.4
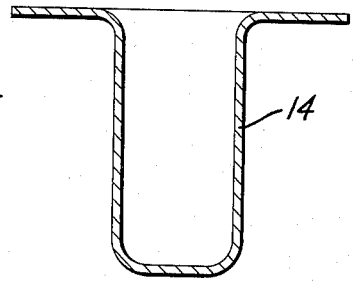
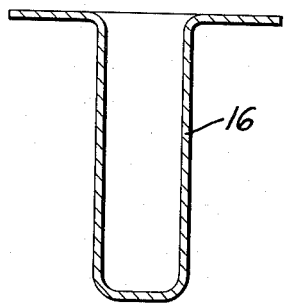
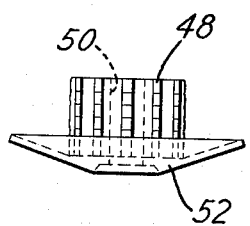
Fig.7
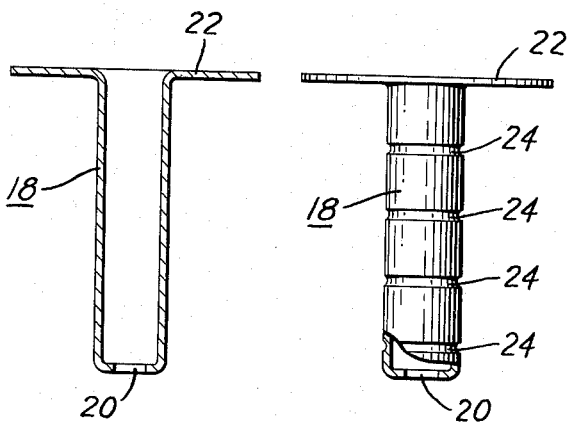
Fig.5   Fig.6
INVENTOR.
WILBUR L. CARLSON
BY
*W. E. Finken*
HIS ATTORNEY Sept. 21, 1965     W. L. CARLSON     3,206,840
METHOD OF MAKING A PINION AND DISC
Filed Nov. 14, 1961     2 Sheets-Sheet 2

INVENTOR.
WILBUR L. CARLSON
BY
HIS ATTORNEY

United States Patent Office 3,206,840
Patented Sept. 21, 1965

3,206,840
METHOD OF MAKING A PINION AND DISC
Wilbur L. Carlson, Rochester, N.Y., assignor to General Motors Corporation, Detroit, Mich., a corporation of Delaware
Filed Nov. 14, 1961, Ser. No. 152,297
3 Claims. (Cl. 29—159.2)

This invention pertains to a disc and pinion assembly, and particularly to the method of cold forming an integral disc and pinion assembly.

A flexible coupling which has been extensively used in electric motor driven actuators is disclosed in Andrews Patent 2,785,580. The output of this coupling assembly comprises a steel pinion having a press fit with a coined steel disc which has a substantial area for bonding it to a cushion of elastomeric material. The present invention relates to an integral disc and pinion assembly for a coupling of the aforesaid type and a method of making the same. The integral disc and pinion assembly is substantially cheaper than a separate disc and a separate pinion, and moreover, reduces the assembly operations required to manufacture coupling assemblies.

Accordingly, among my objects are the provision of an integral disc and pinion assembly for a coupling; the further provision of an integral sheet metal pinion and disc assembly; and the still further provision of a method of forming an integral pinion and disc assembly for sheet metal stock by a plurality of sequential cold forming steps.

The aforementioned and other objects are accomplished in the present invention for initially forming the strip stock into a flanged cup-shaped member by progressive drawing operations; thereafter rolling grooves on the periphery of the cup-shaped portion; and then placing the grooved flanged cup into a die and collapsing the same to form an integral pinion and gear assembly. More particularly, the grooved flanged cup-shaped member is placed in a die having a toothed cavity and a complementary arbor is pressed into the die cavity so as to collapse the tubular portion in an accordion-like fashion, and simultaneously therewith form gear teeth on the collapsed portion which constitutes the pinion. The arbor is guided by a pilot shaft which extends through the tubular member so that after the pinion is formed it will have a coaxial through bore.

Further objects and advantages of the present invention will be apparent from the following description, reference being had to the accompanying drawings, wherein a preferred embodiment of the present invention is clearly shown and wherein similar numerals depict similar parts throughout the several views.

In the drawings:

FIGURE 1 is a side view, in elevation, of the strip stock used to form the integral pinion and disc assembly.

FIGURES 2 through 5 are sectional views of successive drawing steps to form the flanged cup-shaped member.

FIGURE 6 is a view, partly in section and partly in elevation, of the drawn cup with grooves.

FIGURE 7 is a view, in elevation, of the completed disc and pinion assembly.

Figure 9:
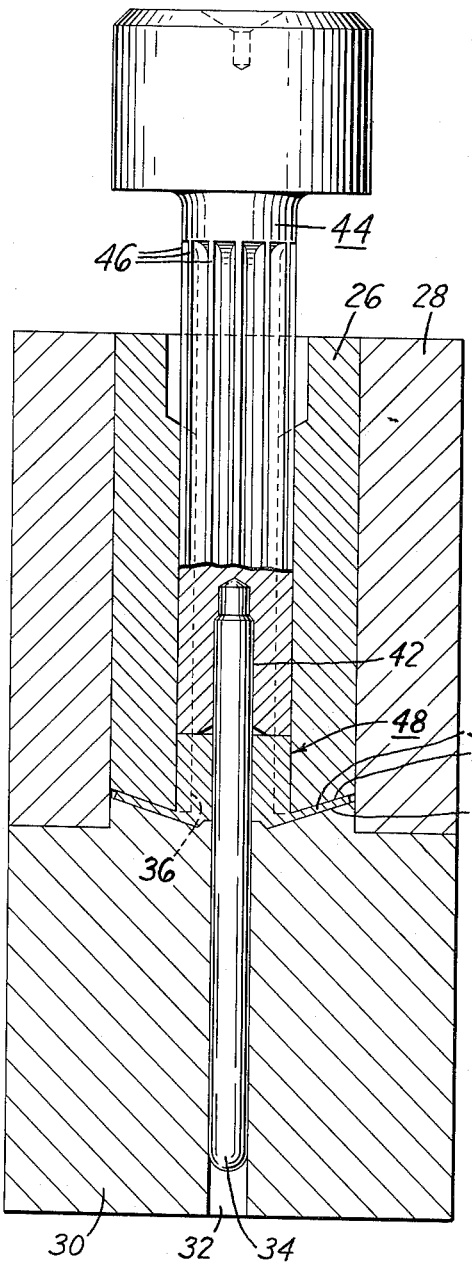
FIGURE 9 is a view similar to FIGURE 8 showing the arbor pressed inwardly into the die after the pinion has been formed.

With particular reference to FIGURES 1 through 6, in accordance with the preesnt invention an integral pinion and disc, or flanged gear, is made from flat steel strip stock depicted by numeral 10 in FIGURE 1. The flat strip stock is formed into a flanged cup-shaped article by progressive drawing operations to form the article 12 of FIGURE 2 in the first step, the article 14 of FIGURE 3 in the second step, the article 16 of FIGURE 4 in the third step and the article 18 in the fourth step as shown in FIGURE 5. Thereafter, a hole 20 substantially coaxial with the cup-shaped portion is formed therein by a punching operation. It can be seen that the article 18 has a flange 22 located substantially normal to the axis of the cup, or tubular, portion, and thereafter the cup portion may have a plurality of spaced grooves 24 rolled in its exterior as shown in FIGURE 6. These grooves facilitate later forming, but can be eliminated if desired.

Figure 8:
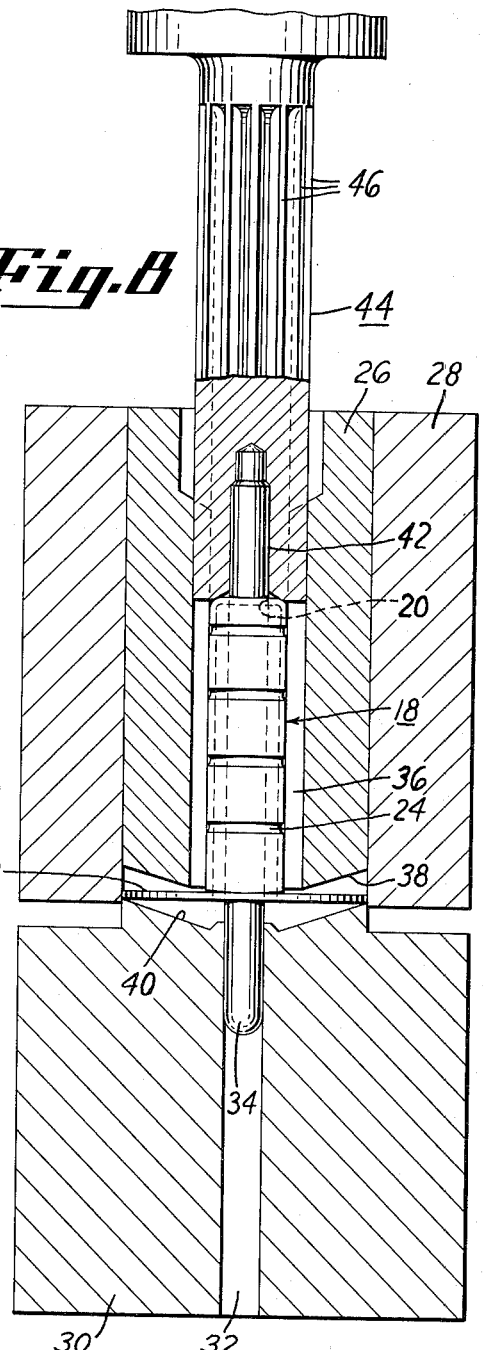
FIGURE 8 is a sectional view of the die and arbor with the tube in position.

Referring to FIGURES 8 and 9, the tubular article 18 is then placed in a die 26 supported in a fixture 28. The fixture and the die coact with a pressure pad 30 having a central through bore 32 within which a pilot shaft 34 is guided for axial movement. The die 26 is formed with internal gear teeth 36 and a tapered end surface 38 which coacts with a complementary surface 40 on the pressure pad. The pilot shaft 34 extends through the die and is shrunk fit into a recess 42 of an arbor 44 having external gear teeth 46 mating with the internal gear teeth 36 of the die. The flanged cup-shaped article 18 is then placed in the die with the pilot shaft extending through the hole 20 in the end thereof. Thereafter the arbor 46 is pressed into the die, and simultaneously therewith the fixture and the die are moved into abutting engagement with the pressure pad. In so doing the cup-shaped portion of the article 18 is collapsed in an accordion-like fashion to form an integral pinion and disc assembly, the disc partaking of the conical shape of the mating ports of the die in the pressure pad.

The completed cold formed sheet metal integral disc and pinion assembly is depicted in FIGURE 7, from which it can be seen that it comprises a toothed pinion 48 having a coaxial through bore 50 which is integral with a frusto conical shaped disc 52. In this form the integral sheet metal disc and pinion assembly can be bonded to an elastic cushion to complete a coupling of the type previously alluded to in the Andrews patent. The rolled grooves 24 in the article 18 as shown in FIGURE 6 materially assist in collapsing the tubular portion during the die forming operation as shown in FIGURES 8 and 9. When completed, the teeth on the pinion 48 are substantially uniform throughout their lengths and require no machining. The several layers of metals which are collapsed upon each other to form the pinion may be visible as indicated in FIGURE 7. The teeth on the pinion 48 extend to the upper surface of the disc 52 as depicted in FIGURE 7 and are in abutment therewith.

While the embodiment of the invention as herein disclosed constitutes a preferred form, it is to be understood that other forms might be adopted.

What is claimed is as follows:

1. The method of cold forming an integral sheet metal flanged gear comprising the steps of, successively drawing said metal blank into a flanged tubular article, grooving the tubular portion of said article, and thereafter collapsing the tubular portion of the article in an accordion-like fashion in a die to form an integral flanged gear.

2. The method of cold forming an integral sheet metal flanged gear comprising the steps of, forming a sheet of strip stock into a flanged tubular article by succesive drawing operations, punching a hole in the bottom of the tubular article, grooving the tubular portion of the article, and collapsing the tubular portion of the article in an accordion-like fashion in a die to form an integral flanged gear.

3. The method of cold forming an integral disc and pinion assembly from sheet metal strip stock comprising the steps of, forming a flanged cup-shaped article by successive drawing operations, punching a hole in the bottom of the tubular portion of the cup-shaped article, grooving the side walls of the tubular portion, placing the grooved cup-shaped article in a die with a pilot shaft extending therethrough, and closing the die to collapse the tubular portion in an accordion-like fashion and simultaneously deforming the flange to form a conical disc integral with a pinion.

References Cited by the Examiner

UNITED STATES PATENTS

| | | | |
|---|---|---|---|
| 1,046,138 | 12/12 | Babbitt et al. | 29—545 X |
| 1,265,811 | 5/18 | Ohlson | 74—460 |
| 1,971,117 | 8/34 | Mossberg | 29—541 |
| 2,654,944 | 10/53 | Wilson | 29—159.2 |
| 2,862,400 | 12/58 | D'Angelo | 74—460 |
| 2,931,094 | 4/60 | Teerlink | 29—159.2 |
| 3,058,204 | 10/62 | Jorgensen | 29—159 |

FOREIGN PATENTS

| | | |
|---|---|---|
| 77,924 | 8/19 | Austria. |
| 559,333 | 3/57 | Italy. |

WHITMORE A. WILTZ, *Primary Examiner.*

HYLAND BIZOT, *Examiner.*